United States Patent [19]

Hunkapiller

[11] Patent Number: 4,703,913
[45] Date of Patent: Nov. 3, 1987

[54] DIAPHRAGM VALVE

[75] Inventor: Michael W. Hunkapiller, Pasadena, Calif.

[73] Assignee: California Institute of Technology, Pasadena, Calif.

[21] Appl. No.: 724,052

[22] Filed: Apr. 18, 1985

Related U.S. Application Data

[62] Division of Ser. No. 421,445, Sep. 22, 1982, Pat. No. 4,558,845.

[51] Int. Cl.[4] .......................................... F16K 31/126
[52] U.S. Cl. .................................. 251/61.1; 137/606;
                                      137/883; 137/884; 137/885
[58] Field of Search ............... 137/606, 883, 884, 885;
                                                             251/61.1

[56] References Cited

U.S. PATENT DOCUMENTS

| 3,083,943 | 4/1963 | Stewart et al. | 251/61.1 |
| 3,749,353 | 7/1973 | Pauliukonis | 251/61.1 |
| 3,763,862 | 10/1973 | Spieth | 251/61.1 X |
| 4,168,724 | 9/1979 | Graffunder et al. | 251/61.1 X |

Primary Examiner—Gerald A. Michalsky
Attorney, Agent, or Firm—Joseph E. Mueth

[57] ABSTRACT

Briefly, the present invention comprises the improvement in a valve arrangement for controlling the flow of a fluid including a valve block having at least one substantially flat valving site on a surface thereof, the valve block defining passages communicating with the valving site through openings, a resilient diaphragm covering the valving site and forming a fluid tight seal with the valve block along the periphery of the valving site and a closure element having a substantially flat closure surface, the closure element being actuable between an open condition wherein the closure surface is retracted a preselected distance from the valving site and diaphragm, and a closed condition wherein the closure surface forces the diaphragm against the valving site; whereby the diaphragm can be urged away from the valving site by fluid pressure in the passages and the closure element is in the open condition, establishing a valve chamber above the valving site for fluid flow between the passages, and if forced against the valving site when the closure element is in the closed condition, eliminating the valve chamber and expelling any fluid therein; the said improvement for which a patent is sought comprising a valve block having said passages therein which are free of intersections within the valve block.

1 Claim, 10 Drawing Figures

DIAPHRAGM VALVE

This application is a division, of application Ser. No. 421,445, filed Sept. 22, 1982, now U.S. Pat. No. 4,558,845.

BACKGROUND OF THE INVENTION

This invention relates generally to an improved diaphragm valve and, more particularly, to a diaphragm flow valve having no dead volume and no internal interconnecting fluid passages.

In many applications, it is desirable to regulate the flow of fluids in a manner minimizing intermixing of the fluids and cross-contamination therebetween. Such is the case, for example, in the apparatuses described in U.S. Pat. No. 4,008,736 to Wittmann-Liebold, et al., U.S. Pat. No. 4,252,769 to Hood, et al., and co-pending U.S. patent application No. 190,100 of Hood, et al, now abandoned. Each of the above-listed apparatuses is designed for the sequential performance of a large number of chemical processes on a relatively small sample of chemical material. The results achieved in each successive chemical step in the sequence is thus entirely dependent on the purity of the sample and the other chemical components of the system following the preceding steps. The large number of chemical steps performed with such apparatuses also requires that the performance characteristics of all system components be sustainable over relatively long periods of use.

The valve arrangement of Wittmann-Liebold U.S. Pat. No. 4,008,736 includes a valve block having an elongated zig-zag passage therethrough, the zig-zag passage having a plurality of openings communicating with respective valving sites thereon. Fluid communication with the elongated passage is regulated by a plurality of apertured sliding blocks engaging the valve block at the valving sites thereof. The apertured blocks are actuable alternately between conditions of communication and non-communication between the aperture therein and the corresponding opening in the valve block. The zig-zag configuration of the Wittmann-Liebold zig-zag passage has the advantage of permitting the valve arrangement to be easily flushed of residual fluids, however, the individual sliding blocks tend to wear considerably, causing leaks both to the atmosphere and between the various passages and apertures. Leaks of this nature produce contamination of the system from the atmosphere and cross-contamination between successive steps or cycles of the system itself. Contamination of this nature has a cumulative effect on the chemistry within the apparatus over a large number of cycles of operation.

The apparatus of the above-listed Hood, et al. application No. 190,100, now abandoned, includes a valve block having a zig-zag primary passage of the Wittmann-Liebold type, and a plurality of secondary conduits terminating in additional openings at the respective valving sites. Diaphragms extending across the valving sites are alternately drawn away from and forced against the surface of the block by vacuum and positive gas pressure, respectively, to open and close a fluid pass between the openings at the valving site. While this configuration significantly improves upon the performance achievable with the Wittmann-Liebold valve, its performance is less than optimum in several respects. For instance, while the positive air pressure used to force the diaphragms against the valving sites is sufficient to terminate the flow of fluids between the openings at each valving site, it is sometimes incapable of completely expelling the last traces of fluid from the area between the valving site and the diaphragm. This problem becomes most acute after much use of the valve arrangement when the diaphragm becomes slightly stretched or puckered. Small pockets of residual fluid can then be trapped beneath a diaphragm away from the corresponding opening when the particular valve is closed. These residual traces of fluid are not susceptible to being flushed by a flow through the primary passage. Also, these valves can lead to system contamination in the event of a power failure or a minute perforation of a diaphragm. A power failure can eliminate the source of pressure necessary to close the valves while a ruptured diaphragm can result in the direct application of either vacuum or pressurized gas to the openings at the valve sites.

The above noted problems resulting from stretched or ruptured diaphragms are rendered more serious by the fact that the fluid, et al. valves are opened by applying a vacuum to the surface of the diaphragm to draw them upwardly into recesses of predetermined volume. The diaphragms are thus made to substantially conform to the shape of the recesses each time the individual valves are opened. The diaphragms are thus constantly being stretched and stressed during operation, increasing the likelihood that they will eventually rupture or fail to return to their original configuration.

The fluid, et al. valve apparatus is also rather expensive to install and to maintain, due primarily to the need for vacuum and high-pressure sources, lines and associated valves Therefore, in many applications, it is desirable to provide a valve apparatus which is modular in design and minimizes the various possibilities of fluid contamination over a large number of operating cycles.

More recently, there has been invented a valve apparatus of Stark, copending U.S. patent application Ser. No. 300,184, now abandoned. The Stark valve apparatus comprises a valve block means having at least one substantially flat valving site on a surface thereof, said valve block means defining primary and secondary passages communicating with said valving site through primary and secondary openings, respectively. The valve block is an elongated block of rectangular cross-section having a continuous primary passage in a sawtooth or zig-zag pattern formed by cross-drilling the valve block from the upper surface thereof. The primary passage is thus a continuous passage communicating at alternating intersections thereof with a plurality of valving sites on the surface through corresponding openings. A resilient diaphragm means covers the valving site and forms a fluid tight seal with the valve block means along the periphery of the valving site. At least one closure element is provided having a substantially flat closure surface, the closure element being actuable between an open condition wherein the closure surface is retracted a preselected distance from the valving site and the diaphragm means, and a closed condition wherein the closure surface forces the diaphragm means against the valving site. In this way, the diaphragm means can be urged away from the valving site by fluid pressure in the passages when the closure element is in the open condition, establishing a valve chamber above the valving site for fluid flow between the passages, and is forced against the valving site when the closure element is in the closed condition, eliminating said valve chamber and expelling any fluid therein.

The passages in the Stark valve have a series of internal intersections which are difficult to machine accurately, resulting in high production costs. The present invention avoids this serious problem by eliminating the internal intersections within the valve block and represents an important advance in this art.

SUMMARY OF THE INVENTION

Briefly, the present invention comprises the improvement in a valve arrangement for controlling the flow of a fluid including a valve block having at least one substantially flat valving site on a surface thereof, the valve block defining passages communicating with the valving site through openings, a resilient diaphragm covering the valving site and forming a fluid tight seal with the valve block along the periphery of the valving site and a closure element having a substantially flat closure surface, the closure element being actuable between an open condition wherein the closure surface is retracted a preselected distance from the valving site and diaphragm, and a closed condition wherein the closure surface forces the diaphragm against the valving site; whereby the diaphragm can be urged away from the valving site by fluid pressure in the passages and the closure element is in the open condition, establishing a valve chamber above the valving site for fluid flow between the passages, and if forced against the valving site when the closure element is in the closed condition, eliminating the valve chamber and expelling any fluid therein; the said improvement for which a patent is sought comprising a valve block having said passages therein which are free of intersections within the valve block.

It is an object of the present invention to provide an improved valve apparatus which is free of internal intersections and is used for accurately controlling the flow of fluids within a system with a minimum of contamination and cross-contamination of the fluids.

It is also an object of the present invention to provide a novel and improved valve apparatus able to shut off a flow of fluids without leaving any dead volume in which the fluids can be trapped when the valve is closed which can be easily and efficiently machined.

It is another object of the present invention to provide an improved valve apparatus which minimizes the machining problems in the manufacture.

These and other objects and advantages of this invention will be apparent from the detailed discussion which follows, particularly when taken in conjunction with the accompanying drawings.

BRIEF DESCRIPTION OF THE DRAWINGS

The above and other objects of the present invention may be more fully understood from the following detailed description taken together with the accompanying drawings wherein similar reference characters refer to similar elements throughout and in which.

DESCRIPTION OF THE PREFERRED EMBODIMENTS

Figure 1:
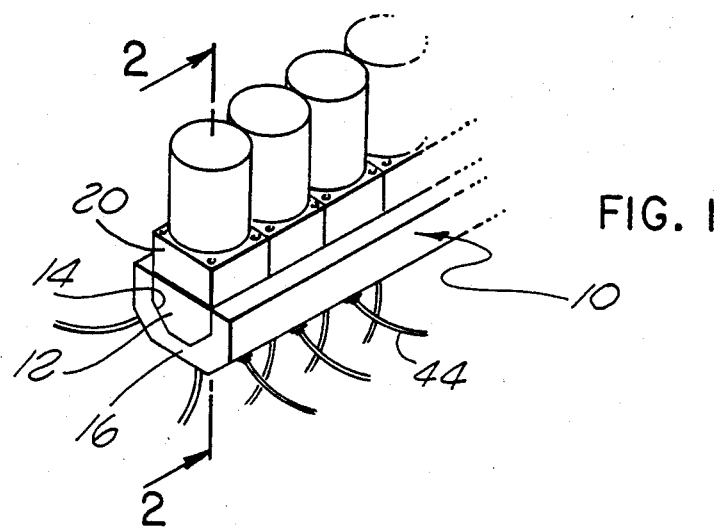
FIG. 1 is a perspective view of a valve arrangement constructed in accordance with the present invention.

Referring now to the drawings, there is illustrated in FIGS. 1 through 5 thereof, an apparatus embodying the present invention, generally designated 10. This novel apparatus provides a zero-dead-volume, single or multi-unit, diaphragm valve that is modular-based and easy to construct. The modular valve units can be connected to each other to generate multi-way valves with several inlets (outlets) and a common outlet (inlet) with no dead volume between the inlets and outlets and no dead or blind pockets in the common line. The apparatus 10 includes a valve block 12 received within an opening 14 in a base 16. The upper surface of the valve block 12 is covered with an imperforate resilient diaphragm 18 which is covered by diaphragm retaining block 20. The various elements are snugly held in place by a plurality of screws 22 extending downwardly through the retaining block 20, the diaphragm 18 and openings 24 in the valve block 12 to threadingly engage the base 16. The valve body 12 of each unit can be machined independently of the other valve units. The metal base 16 contains threaded ports 26 for insertion of the connector fittings 28 that allow connection of the internal passages 30 in the valve block 12 to those in adjacent units or to external supply or exit lines for the valve complex. The connector fittings 28 are of zero-dead-volume to maintain the zero-dead-volume characteristics of the overall valve assembly. Each valve unit is operated by a pneumatic of solenoid actuated (FIG. 2) or pneumatic actuated (FIG. 4) diaphragm 18 that when pressed flat against the top surface of the valve block 12 prevents flow across the top of the value block from inlet to outlet. When pressed firmly and flatly, the diaphragm 18 prevents flow across the surface from ports 32 and 34. When lifted in the area above 32 and 34, the diaphragm 18 creates a pocket above them through which blow between 32 and 34 can occur. Even with the diaphragm 18 flat (i.e., closed), flow can occur from 36 to 32 to 38.

Figure 2:
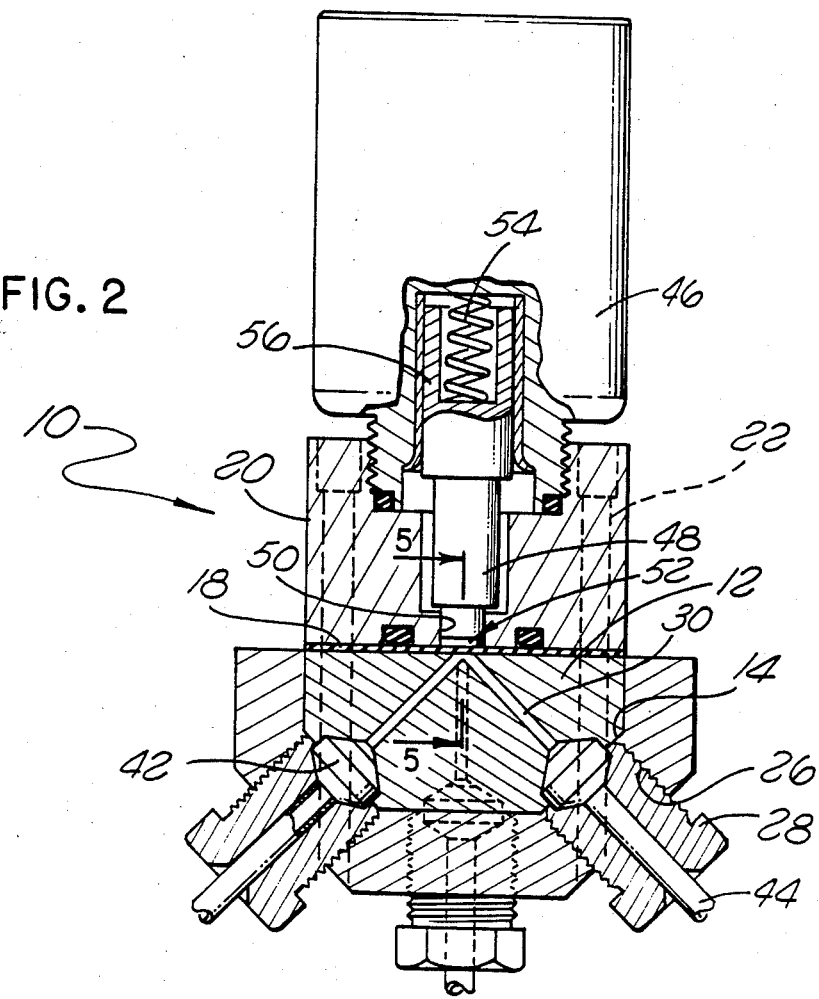
FIG. 2 is a vertical sectional view taken along the line 2—2 of FIG. 1.
Figure 3:
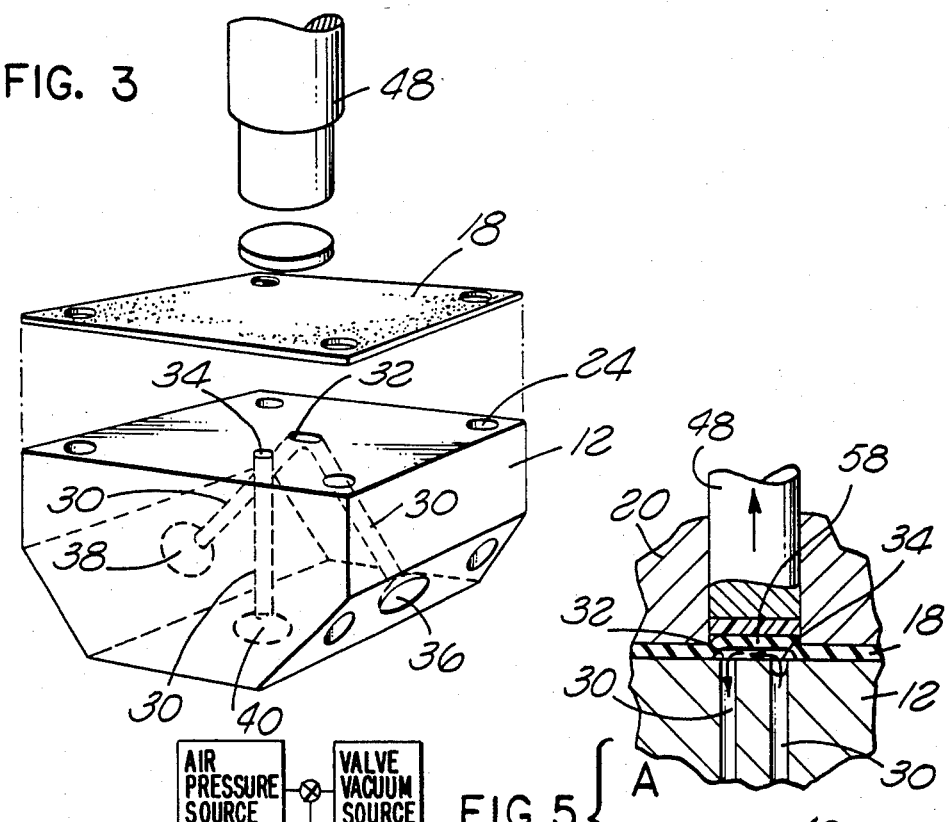
FIG. 3 is an exploded view of the part of the valve arrangement of FIGS. 1 and 2.
Figure 5:
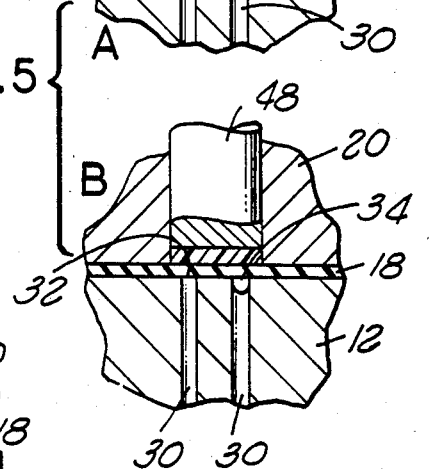
FIGS. 5A and 5B are enlarged fragmentary sectional views of the valve chamber area illustrated in FIG. 2, illustrating the open and closed conditions of the valve, respectively.

A suitable zero-dead-volume connection to ports 36, 38 and 40 can be made using a doubly-taped compression fitting as shown in FIG. 2. Screwing the connector fittings 28 into the threaded ports 26 compresses the teflon ferrule 42 around the tubing 44 at both ends of the ferrule, and also compresses the ferrule into the matching recess in the valve body 12 to effect seals at all critical points. The diaphragm 18 can be actuated either pneumatically or by a solenoid that impinges on the diaphragm.

The downwardly directed solenoid device 46 is threaded into the upper ends of the retaining block 20, with cylindrical plunger 48 extending downwardly through opening 50 of the retaining block at a location directly above the valving site 52. The plunger 48 is biased downwardly toward the valving site 52 by coil spring 54 which is partially received within central recess 56 of the plunger 48. The plunger 48 thus normally bears downwardly against the diaphragm 18 to force the diaphragm firmly against the valving site 52. In this condition, there is no space or volume between the valving site 52 and the diaphragm 18 within which fluid from the passage can become trapped. All of the fluid is expelled by the spring 54 acting through the plunger 48.

The solenoid device 46 can be of conventional construction, able to draw the plunger 48 upwardly into the recess 56 against the force of the spring 54.

When the plunger 40 is drawn upwardly, the resilient diaphragm 18 above the valving site 52 is able to move away from the valving site under the influence of fluid pressure from either of the passages 30, as shown in FIG. 5A. This movement of the resilient diaphragm 18 establishes a valve chamber 58 above the valving site 52, permitting fluid to flow at a controlled rate between the passages 30.

Figure 4:
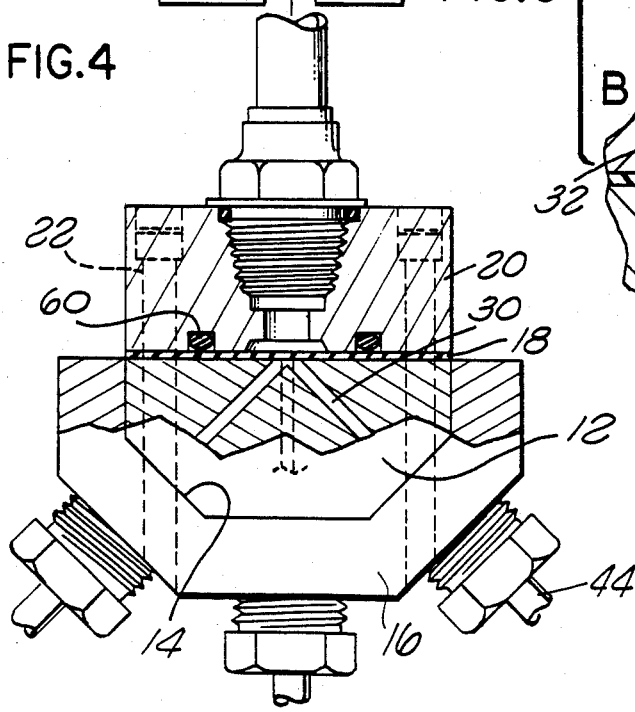
FIG. 4 is a vertical sectional view corresponding generally to FIG. 2, illustrating a second embodiment of the valve arrangement of the present invention.

With the pneumatic-actuated valve of FIG. 4 a three-way pilot solenoid valve is used to supply compressed air to keep the diaphragm 18 closed or negative pressure from a vacuum source to lift the diaphragm 18 off the valve block 12. An elastomeric O-ring 60 between the top of the diaphragm 18 and the bottom of the metal retaining block 20 seals the positive-negative pressure area from atmosphere.

The valve modules of this invention can be combined to yield a variety of useful configurations as shown in FIGS. 6 to 9. Their common feature is that they provide a zero-dead-volume (zero-holdup) configuration. The common connections provide a conduit that is continuous and open even when the valve diaphragms are closed, and when the diaphragms are closed there is no liquid left in the valve face other than that present in this common conduit; hence the zero-dead-volume designation.

Figure 6:
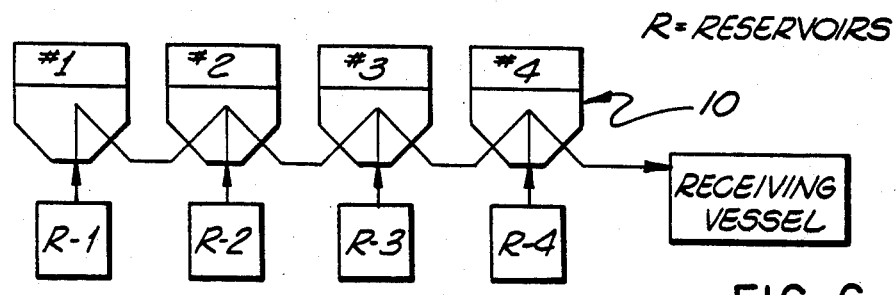
FIG. 6 is a schematic view showing the use in gang fashion of a plurality of valve arrangements, each of which is made in accordance with this invention.

The configuration of FIG. 6 allows any number of reservoirs to supply a common receiver. By making the most distant reservoir No. 1 a supply of inert gas, the entire common outlet can be flushed of any fluid or gas and emptied into the receiver by opening valve No. 1. This leaves no residue for any of the other valves in the line. An important feature is that, unlike a rotary valve configuration, the valves may be opened in any order without contaminating each other or mixing chemicals provided the common line has been purged with gas from No. 1 before each opening of the other valves.

Figure 7:
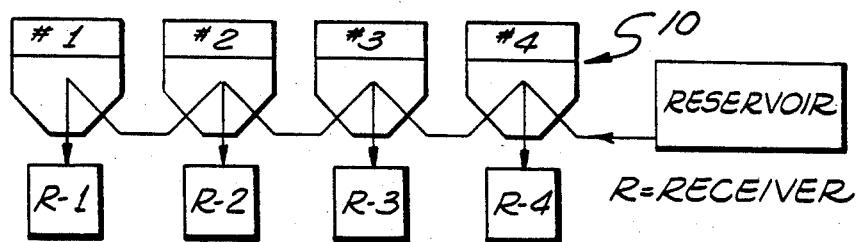
FIG. 7 is another schematic view similar to FIG. 6.

The configuration of FIG. 7 allows the contents of a single reservoir to be dispersed to a variety of receiving vessels. Any receiver can be accessed in any order without affecting the others. Moreover, two or more receivers can be accessed simultaneously, and the relative flow rates to those receivers can easily be changed by changing the internal diameter (and hence flow resistence) of the connectors between the valves or between the valves and the receivers.

Figure 8:
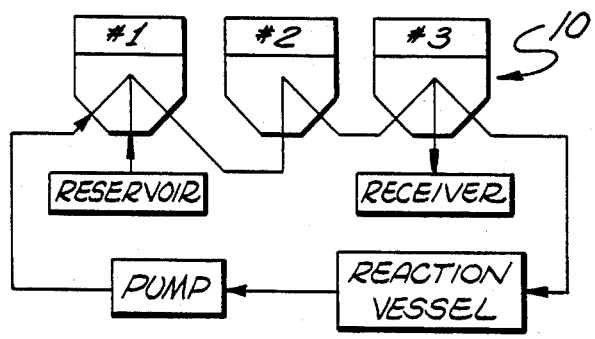
FIG. 8 is yet another schematic view.

The arrangement of FIG. 8 allows introduction of reagent from reservoir to pump with valves 1 and 3 open and pump on so that the reaction vessel and associated lines can be charged with reagent. Then with valves 1 and 3 closed and valve 2 open, the pump can be used to recycle the reagent through the lines and reaction vessel. If the reservoir is actually a multi-inlet, single outlet valve that allows a reagent or a solvent into valve No. 1, then the solvent can be used to easily purge completely both the valve lines and the pump-reaction vessel. This involves two steps (1) purging vessel by opening valves 1 and and closing valve 2 with pump on, (2) purging valves with valves 1, 2 and 3 open and pump off.

Figure 9:
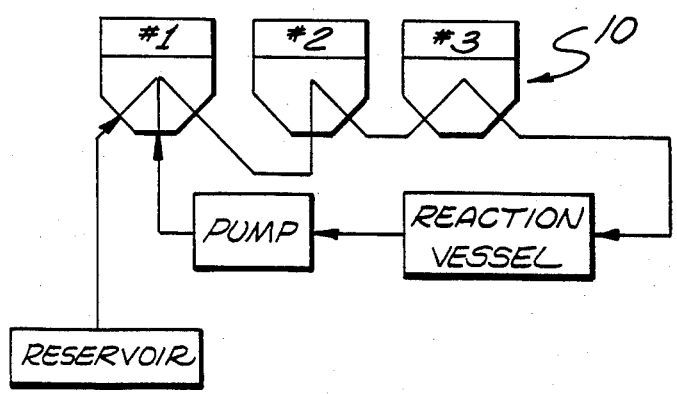
FIG. 9 is also a schematic view.

The arrangement of FIG. 9 is equivalent to FIG. 6 in performance except that (1) to recycle, valves 1 and 2 are open and valve 3 is closed and pump is on, (2) to purge valves, valves 2 and 3 are open and valve 1 is closed and pump is off.

The appended claims are intended to cover all variations and adaptations falling within the true scope and spirit of the present invention.

I claim;

1. A zero dead volume valve for controlling the flow of a fluid including
    a valve block having at least one substantially flat valving site on a surface thereof, said valve block defining a plurality of linear passages therein communicating with the valving site through openings, said passages being free of intersections within said valve block, at least two of said passages intersecting at the surface of said valve block, at said valve site, at least one other of said passages terminating at the surface of said valve block at a point on said valve site which is spaced apart from where said two passages intersect,
    a resilient diaphragm covering said valving site and forming a fluid tight seal with said valve block along the periphery of the valving site,
    positive pressure means,
    negative pressure means,
    a conduit communicating the said positive pressure means and said negative pressure means with said valving site, whereby said diaphragm is lifted off the valving site by negative pressure supplied through said conduit, and said diaphragm is forced against the valving site by positive pressure supplied through said conduit and whereby when the diaphragm is lifted away from the valving site by negative pressure in the conduit, a valve chamber is established above the valving site for fluid flow between the passages allowing fluid communication being all passages at said valve site, and when the diaphragm is forced against the valving site by positive pressure in the conduit, the valve chamber is eliminated, expelling any fluid therein and there is fluid communication only between said intersecting passages.

* * * * *